(12) United States Patent
Van Ieperen

(10) Patent No.: US 7,876,333 B2
(45) Date of Patent: Jan. 25, 2011

(54) METHOD AND GRAPHICAL INTERFACE FOR EMBEDDING ANIMATED CONTENT INTO A COMPUTER APPLICATION

(75) Inventor: Taco Van Ieperen, Calgary (CA)

(73) Assignee: Smart Technologies ULC (CA)

( * ) Notice: Subject to any disclaimer, the term of this patent is extended or adjusted under 35 U.S.C. 154(b) by 0 days.

(21) Appl. No.: 11/392,815

(22) Filed: Mar. 30, 2006

(65) Prior Publication Data

US 2007/0229542 A1 Oct. 4, 2007

(51) Int. Cl.
G09G 5/00 (2006.01)
(52) U.S. Cl. .......................... 345/629; 345/620; 345/626
(58) Field of Classification Search ................. 345/629, 345/592, 626
See application file for complete search history.

(56) References Cited

U.S. PATENT DOCUMENTS

| | | | |
|---|---|---|---|
| 5,448,263 A | | 9/1995 | Martin |
| 5,651,107 A | | 7/1997 | Frank et al. |
| 5,831,615 A | * | 11/1998 | Drews et al. ................. 715/768 |
| 5,949,432 A | | 9/1999 | Gough et al. |
| 6,275,236 B1 | | 8/2001 | Delahunty |
| 6,377,276 B1 | | 4/2002 | Ludtke |
| 6,803,906 B1 | | 10/2004 | Morrison et al. |
| 7,068,266 B1 | * | 6/2006 | Ruelle ......................... 345/418 |
| 7,168,048 B1 | * | 1/2007 | Goossen et al. .............. 715/797 |
| 7,429,993 B2 | * | 9/2008 | Hui ............................. 345/629 |
| 2001/0040584 A1 | * | 11/2001 | Deleeuw ...................... 345/629 |
| 2002/0008703 A1 | * | 1/2002 | Merrill et al. ................ 345/473 |

OTHER PUBLICATIONS

Notification of Transmittal Of The International Search Report And The Written Opinion Of The International Searching Authority for International Application No. PCT/CA2007/000515; the International Search Report; and the Written Opinion, mailed Jul. 5, 2007.
Supplementary European Search Report for European Patent Application Number 07 71 9447 with a completion date of Feb. 16, 2009.

* cited by examiner

Primary Examiner—Kee M Tung
Assistant Examiner—Jacinta Crawford
(74) Attorney, Agent, or Firm—Katten Muchin Rosenman LLP

(57) ABSTRACT

A method of displaying a computer application comprising a plurality of objects within an initially transparent application window comprises creating an animated content window below the application window for each animated content object of the computer application and directing the player responsible for playing the animated content object to draw the animated content directly therein. The objects of the computer application are examined and a clipping mask for each animated content object corresponding generally to the animated content window created therefor is defined. Starting from bottom to top, an object from the list is selected. If the selected object is not an animated content object, the object is drawn within the application window except in areas corresponding to the clipping masks. If the selected object is an animated content object, the clipping mask defined for animated content object is removed, thereby to allow selected objects in the list above the animated content object to be drawn thereover.

10 Claims, 4 Drawing Sheets

METHOD AND GRAPHICAL INTERFACE FOR EMBEDDING ANIMATED CONTENT INTO A COMPUTER APPLICATION

FIELD OF THE INVENTION

The present invention relates generally to the display of computer generated images and in particular, to a method and graphical interface for embedding animated content into a computer application.

BACKGROUND OF THE INVENTION

As is well known, computer applications written for a Windows-type or Mac-type operating system platform, when executed, present a variety of objects within a window. These objects are layered on top of one another. The window can also be layered over top of other application windows. For example, word processing applications enable a user to type text over top of a document image displayed within a window while graphics applications enable a user to create and manipulate shapes over top of a document image displayed within a window. Both the word processing application and graphics application windows can be layered over top of other applications.

Many techniques for handling and displaying layered application windows have been considered. For example, U.S. Pat. No. 5,831,615 to Drews et al. discloses a method and apparatus for re-drawing a transparent window on a display device. If a transparent window and an underlying second window exist, a check is made to determine if the underlying second window is active. If it is determined that the underlying second window is active, the underlying second window is re-drawn on the display device and the transparent window is shown. If the underlying second window is not active, the transparent window is maintained.

U.S. Pat. No. 5,949,432 to Gough et al. discloses a method and apparatus for producing a translucent image over a base image created on a display by a selected first application program. The first application program runs on a central processing unit and produces the base image. An overlay program produces the translucent image such that portions of the base image which are overlapped by the overlay image are at least partially visible through the translucent image.

U.S. Pat. No. 6,275,236 to Delahunty discloses a system and method for displaying tracked objects on a display. The current location and a number of previous locations of the objects are written with pixel values having non-zero overlay data. An ordered set of codes is written into pixel values for the current location and the set of codes is indicated to a driver. The driver uses the overlay data displaying the current and previous object locations sequentially in order of the set. The displayed locations may be displayed by unmasking the overlay data.

With respect to computer applications comprising layered objects, providing rich animated content in such computer applications to enhance the visual impact that the computer applications have on viewers is common. Such rich animated content may for example take the form of Java applets, Macromedia Flash, Apple Quicktime video, RealVideo and Widows Media Player video to name a few.

Typically, when animated content is to be embedded into a computer application, a window residing on top of the computer application is established by the computer application into which the animated content is to be drawn. The computer application then tells the player responsible for playing the animated content where the window is, allowing the player to draw into the window directly on-screen without notifying the computer application. Although this enables the animated content to be drawn efficiently, it has drawbacks as the window for the animated content resides on top of the computer application and thus, always remains visible. As will be appreciated, this can be problematic in some environments, such as for example in interactive applications where users write, annotate and draw on displayed images. Because the window for the animated content resides on top of the computer application, users are unable to draw over the animated content effectively reducing the interactive area of the computer application.

Attempts to deal with this problem have been considered. For example, to enable animated content to be incorporated into an interactive computer application without reducing the interactive area of the computer application, rather than having the player write the animated content directly on-screen into a window residing on top of the computer application, the player is directed to write the animated content to an off-screen buffer or bitmap. The bitmap is treated by the computer application as an object and is drawn by the computer application within its window allowing annotations, writing etc. to appear over the animated content. Unfortunately, forcing the player to write the animated content to the off-screen buffer is extremely slow as compared to writing directly to a window on-screen. Copying the animated content from the off-screen buffer to the computer application for display is also very slow. The end result is a significant drop in performance making this approach impractical. As will be appreciated, there exists a need for improvements in embedding animated content into computer applications.

It is therefore an object of the present invention to provide a novel method and graphical interface for embedding animated content into a computer application.

SUMMARY OF THE INVENTION

Accordingly, in one aspect there is provided a method of embedding animated content in a computer application having an associated initially transparent window in which application content is displayed, said method comprising:

drawing animated content into at least one animated content window overlapping with the computer application window;

for each object of the computer application defined to be below the animated content, drawing the object at its appropriate location within the computer application window except at a location generally corresponding to said at least one animated content window; and for each object of the computer application defined to be above the animated content, drawing the object at its appropriate location within the computer application window.

In one embodiment, the location of the at least one animated content window relative to the computer application window is defined prior to drawing of the computer application window. A clipping region for the animated content is defined that is active only for each object below the animated content. The clipping region inhibits each object below the animated content from overwriting the at least one animated content window.

According to another aspect there is provided a method of displaying a computer application comprising a plurality of objects to be layered on top of one another within an initially transparent application window, said method comprising:

creating an animated content window below the application window for each animated content object of said computer application and directing the player responsible for playing the animated content object to draw the animated content directly therein;

examining the objects of said computer application and defining a clipping mask for each animated content object corresponding generally to the animated content window created therefor;

starting from bottom to top, selecting an object;

if said selected object is not an animated content object, drawing said object within said application window except in areas corresponding to each clipping mask; and if said selected object is an animated content object, removing the clipping mask defined for said animated content object, thereby to allow selected objects above said animated content object to be drawn over the animated content.

According to yet another aspect there is provided a method of displaying a computer application comprising a plurality of objects within an initially transparent application window, said method comprising:

defining an animated content window for each animated content object of said computer application;

defining a clipping mask for each animated content object of said computer application that corresponds generally to the animated content window created therefor, each clipping mask applying only to objects below its associated animated content object; and drawing the objects of said computer application within the application window, wherein drawn non-animated content objects below animated content objects are inhibited by the clipping masks from overwriting the animated content windows.

According to still yet another aspect there is provided a graphical interface presenting layered objects of an executing computer application comprising:

a transparent application window;

at least one animated content window overlapping with the application window in which animated content is directly written;

at least one non-animated content object below an animated content object drawn into the application window except at a location corresponding to said at least one animated content window; and at least one non-animated content object above the animated content object drawn into the application window over said at least one animated content window.

According to still yet another aspect there is provided a computer readable medium embodying a computer program for displaying a computer application comprising a plurality of objects to be layered on top of one another within an initially transparent application window, said computer program comprising:

computer program code for creating an animated content window below the application window for each animated content object of said computer application and directing the player responsible for playing the animated content object to draw the animated content directly therein;

computer program code for examining the objects of said computer application and defining a clipping mask for each animated content object corresponding generally to the animated content window created therefor;

computer program code for, starting from bottom to top, selecting an object;

computer program code for drawing said object within said application window except in areas corresponding to each clipping mask if said selected object is not an animated content object; and computer program code for removing the clipping mask defined for said animated content object, thereby to allow selected objects above said animated content object to be drawn over the animated content if said selected object is an animated content object.

According to still yet another aspect there is provided a computer readable medium embodying a computer program for displaying a computer application comprising a plurality of objects within an initially transparent application window, said computer program comprising:

computer program code for defining an animated content window for each animated content object of said computer application;

computer program code for defining a clipping mask for each animated content object of said computer application that corresponds generally to the animated content window created therefor, each clipping mask applying only to objects below its associated animated content object; and computer program code for drawing the objects of said computer application within the application window, wherein drawn non-animated content objects below animated content objects are inhibited by the clipping masks from overwriting the animated content windows.

As will be appreciated, the display method and graphical interface allows animated content to be drawn directly on-screen without requiring the animated content to reside on top of the computer application into which it has been embedded. In this manner, the animated content can be efficiently drawn and displayed while still allowing the animated content to be overwritten by other objects.

BRIEF DESCRIPTION OF THE DRAWINGS

An embodiment will now be described more fully with reference to the accompanying drawings in which.

DETAILED DESCRIPTION OF THE EMBODIMENT

A method and graphical interface for embedding animated content into a computer application of the type comprising various objects that may be layered on top of one another and displayed above the animated content is provided. Within the context of this disclosure, embedding refers to animated content that shares the same display space as, and thus overlaps with, the computer application window presented on the graphical interface. The objects in the list may comprise form, control, graphical, animated content and other objects.

During running of the computer application, the list of objects making up the computer application is examined to locate animated content objects (step 100). For each animated content object in the list, a window within the graphical interface presented on the display into which the animated content is to be drawn, that resides below the computer application window, is defined by the computer application (step 102). The computer application then tells the player responsible for playing the animated content where the window defined for that animated content object is, so that the animated content is drawn directly into the window without notifying the computer application. The window is positioned at the location where the animated content is to appear within the computer application window.

Figure 1:
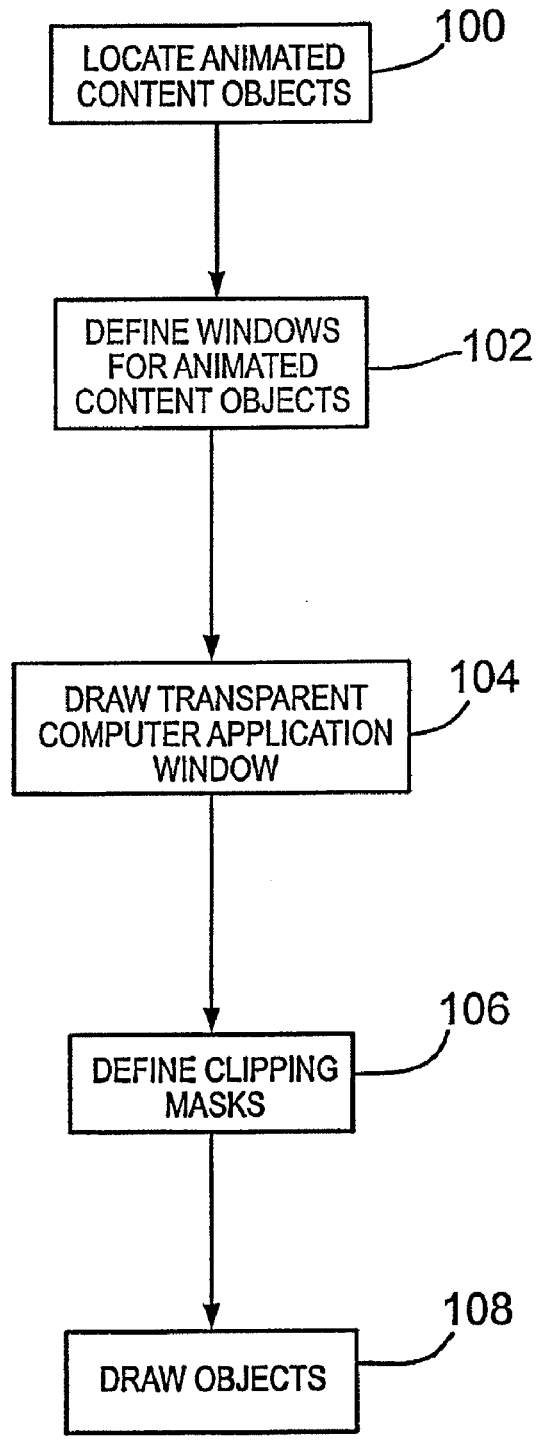
FIG. 1 is a flowchart showing the general steps performed during display of a computer application including embedded animated content.
Figure 2:
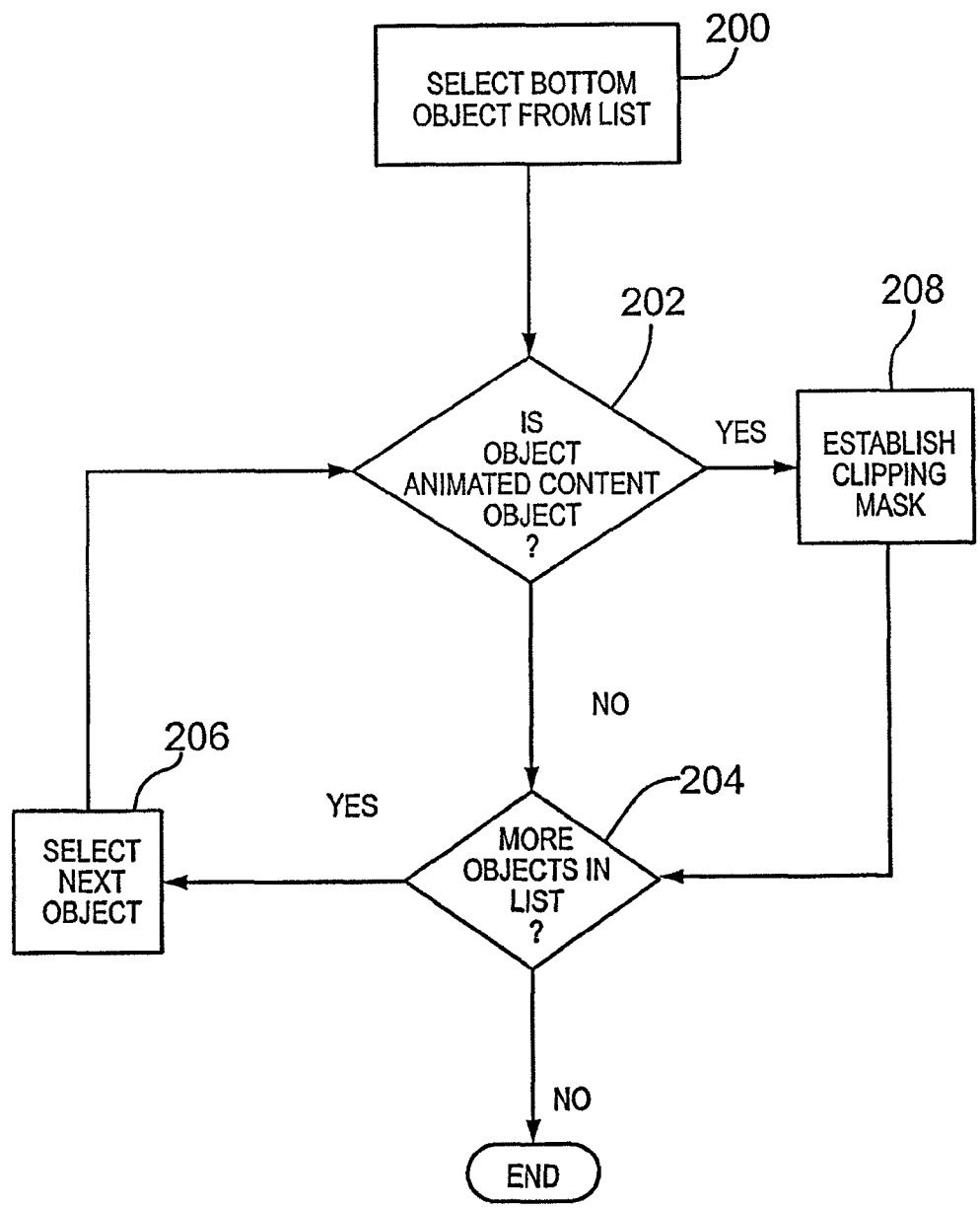
FIG. 2 is a flowchart showing the steps performed during clipping mask defining.
Figure 3:
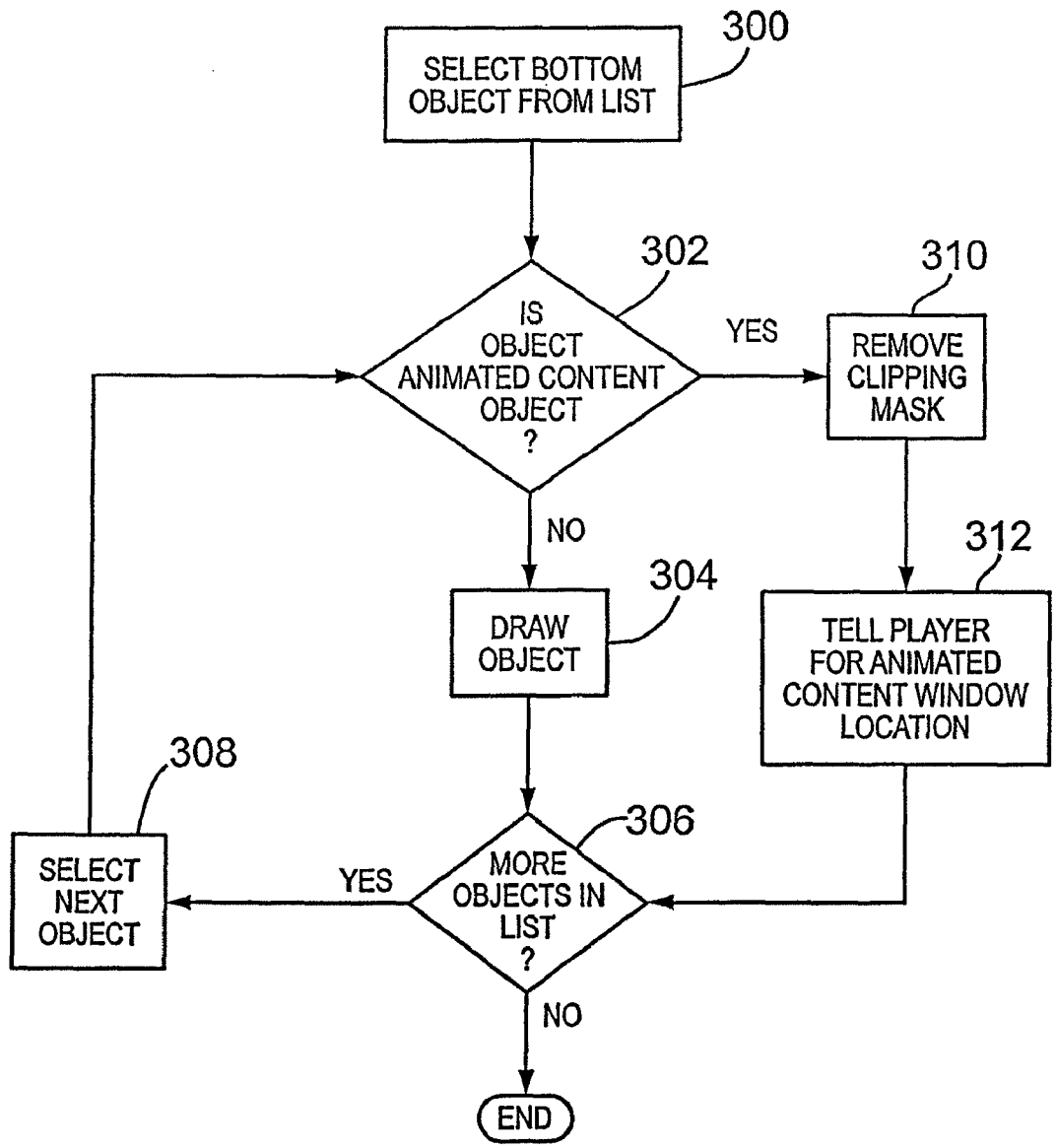
FIG. 3 is a flowchart showing the steps performed during object drawing.

A transparent computer application window for the computer application is then drawn by the computer application on the graphical interface over the defined animated content windows (step 104). As is known by those of skill in the art, Mac OSX and Windows provides for the ability for application windows to be transparent so that whatever is beneath the transparent application windows is visible. In this manner, the defined animated content windows are visible through the computer application window. Clipping masks corresponding in shape and size to the windows in which the animated content is to be drawn are defined (step 106). The objects of the computer application are then handled and drawn from bottom to top within the computer application window. Non-animated content objects in the list that appear below one or more animated content objects cannot draw into the regions defined by the associated clipping mask(s) and thus, cannot overwrite the animated content displayed in the windows associated with those animated content objects. The clipping masks defined for animated content objects that are below non-animated content objects are removed prior to drawing of the non-animated content objects above them and thus, these non-animated content objects can overwrite the animated content displayed in the windows associated with the animated content objects below them. As will be appreciated, steps 102 to 108 are performed whenever the computer application window receives input focus i.e. becomes active, is moved, or is resized. Further specifics concerning the clipping mask defining and object drawing procedures will now be described with reference to FIGS. 2 to 4.

During defining of the clipping masks for the animated content objects at step 106, the bottom object in the list is initially selected (step 200 in FIG. 2) and a check is made to determine if the selected object is an animated content object (step 202). If the selected object is not an animated content object, the list is examined to determine if one or more other objects exist (step 204). If so, the next object in the list is selected (step 206) and the process reverts back to step 202 to determine if the selected object is an animated content object. If not, the clipping mask defining procedure is deemed to be completed.

At step 202, if the selected object is an animated content object, the size and shape of the window into which the animated content object is to be drawn is determined and a clipping mask corresponding in size and shape to the window is established (step 208). The list is then examined to determine if one or more other objects exist (step 204). If so, the next object in the list is selected (step 206) and the process reverts back to step 202 to determine if the selected object is an animated content object. If not, the clipping mask defining procedure is deemed to be completed.

During drawing of the objects in the list at step 108, again the bottom object in the list is initially selected (step 300 in FIG. 3) and a check is made to determine if it is an animated content object (step 302). If not, the non-animated content object is drawn at its designated location within the computer application window (step 304). If a clipping mask for one or more animated content objects above the selected non-animated content object exists, the non-animated content object is prevented from being drawn in the region defined by each clipping mask. In this manner, if the designated location for the non-animated content object overlaps with a window designated for animated content, the non-animated content object is inhibited from overwriting the window ensuring that the window remains visible.

Once the non-animated content object has been drawn, the list is examined to determine if one or more other objects exist (step 306). If so, the next object in the list is selected (step 308) and the process reverts back to step 302 to determine if the selected object is an animated content object. If not, the object drawing procedure is deemed to be completed.

At step 302, if the selected object is an animated content object, the clipping mask defined for the animated content object is removed (step 310). The computer application then directs the player responsible for playing the animated content to draw the animated content into its associated window. The list is then examined to determine if one or more other objects exist (step 306). If so, the next object in the list is selected (step 308) and the process reverts back to step 302 to determine if the selected object is an animated content object. If not, the object drawing procedure is deemed to be completed. As will be appreciated following step 310, once the clipping mask associated with an animated content object has been removed, selected non-animated content objects in the list above that animated content object are not prevented from writing over its associated window in which the animated content is drawn. In this manner, non-animated content objects corresponding to user input annotations, drawing, writing etc. can write over the animated content object.

Figure 4:
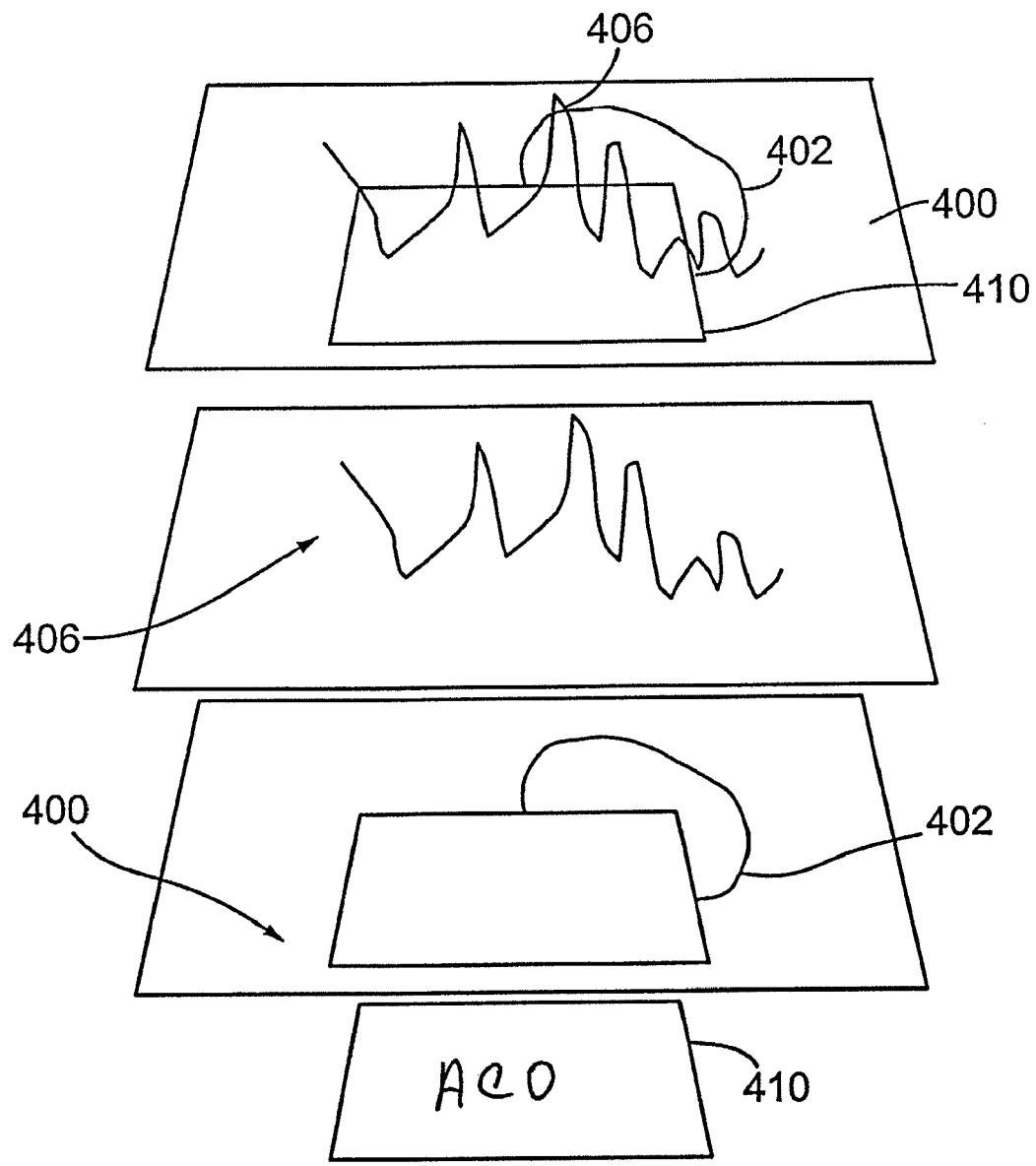
FIG. 4 shows an exploded view of layered objects of a computer application including embedded animated content and a collapsed view of the same layered objects.

For example, turning now to FIG. 4, the objects of a computer application are shown in an exploded view as well as in a collapsed single view as displayed by the graphical interface. In this example, the computer application includes the following objects listed from bottom to top as follows:

Shaded background 400;
Free-hand circle 402;
Animated content object ACO; and
Hand-drawn line 406.

During drawing of the computer application objects, as the shaded background and free-hand circle non-animated content objects 400 and 402 respectively appear in the list below the animated content object ACO, at step 108 when these objects are drawn, the clipping mask defined for the animated content object inhibits the objects from drawing over the window 410 designated for the animated content object ACO ensuring that the window remains fully visible through these objects. The hand-drawn line non-animated content object 406 however appears in the list above the animated content object ACO and thus, when this object is being drawn, the clipping mask defined for the animated content object ACO has been removed. This of course allows the hand-drawn line object 406 to overwrite the window 410 designated for the animated content object ACO.

The above method of displaying a computer application including embedded animated content is particularly suited to interactive applications running on touch systems such as those disclosed in U.S. Pat. No. 5,448,263 to Martin and U.S. Pat. No. 6,803,906 to Morrison et al., assigned to SMART Technologies Inc. of Calgary, Alberta. Of course, the method can be used in basically any environment where computer applications including embedded animated content are being run.

The method and graphical interface may be embodied as computer executable instructions or program code executed by a processing unit such as a personal computer or other computing system environment and stored on a computer readable medium. The computer readable medium is any data storage device that can store data, which can thereafter be read by a computer system. Examples of computer readable medium include for example read-only memory, random-access memory, CD-ROMs, magnetic tape and optical data storage devices. The computer readable program code can also be distributed over a network including coupled computer systems so that the computer readable program code is stored and executed in a distributed fashion.

Although an embodiment has been described above, those of skill in the art will appreciate that variations and modifications may be made without departing from the spirit and scope thereof as defined by the appended claims.

What is claimed is:

1. A method of embedding animated content into a computer application, said method comprising:
    drawing animated content into at least one animated content window overlapping with the computer application displayed on a graphical user interface;
    drawing a transparent window above the at least one animated content window displayed on the graphical user interface;
    defining at least one object of the computer application below the animated content and drawing the at least one object at its appropriate location within the computer application except at a location generally corresponding to said at least one animated content window displayed on the graphical user interface; and
    defining at least one object of the computer application above the animated content and drawing the at least one object at its appropriate location within the transparent window that is above the at least one animated content window so that the at least one object within the transparent window is drawn over the animated content displayed on the graphical user interface.

2. The method of claim 1 further comprising defining a clipping region for animated content that is active only for each object below the animated content, said clipping region inhibiting each object below the animated content from overwriting the at least one animated content window.

3. The method of claim 1 further comprising defining the location of the at least one animated content window relative to said computer application window prior to drawing said computer application window.

4. The method of claim 3 further comprising defining a clipping region for animated content that is active only for each object below the animated content, said clipping region inhibiting each object below the animated content from overwriting the at least one animated content window.

5. A method of displaying a computer application comprising a plurality of objects to be layered on top of one another displayed on a graphical user interface, said method comprising:
    creating an animated content window below the computer application displayed on the graphical user interface window for each animated content object of said computer application and directing the player responsible for playing the animated content object to draw the animated content directly therein;
    creating a transparent window over each animated content window displayed on the graphical user interface;
    examining the objects of said computer application and defining a clipping mask for each animated content object corresponding generally to the animated content window created therefor;
    starting from bottom to top, selecting an object;
    if said selected object is not an animated content object, drawing said object within said computer application displayed on the graphical user interface except in areas corresponding to each clipping mask; and
    if said selected object is an animated content object, removing the clipping mask defined for said animated content object, thereby to allow selected objects above said animated content object to be drawn into the transparent window and over the animated content displayed on the graphical user interface.

6. A method of displaying a computer application on a graphical user interface, said method comprising:
    defining an animated content window for each animated content object of said computer application displayed on the graphical user interface;
    defining a clipping mask for each animated content object of said computer application that corresponds generally to the animated content window defined therefor, each clipping mask applying only to objects below its associated animated content object displayed on the graphical user interface;
    defining a transparent application window overlying said computer application and each animated content window displayed on the graphical user interface;
    drawing the objects within the computer application displayed on the graphical user interface, wherein drawn non-animated content objects below animated content objects are inhibited by the clipping masks from overwriting the animated content windows displayed on the graphical user interface; and
    annotating within said transparent window, wherein annotations within said transparent window are not inhibited by said clipping masks and are displayed overtop said computer application and said animated content windows displayed on the graphical user interface.

7. A computer display presenting layered objects of an executing computer application, comprising:
    a computer display screen displaying a computer application window;
    at least one animated content window overlapping with the computer application window into which animated content is directly written;
    a transparent application window overlying both the computer application window and the at least one animated content window displayed on the computer display screen;
    at least one non-animated content object below an animated content object drawn into the computer application window except at a location corresponding to said at least one animated content window displayed on the computer display screen; and
    at least one non-animated content object above the animated content object drawn into the transparent window over said at least one animated content window displayed on the computer display screen.

8. A computer display according to claim 7, comprising a plurality of non-animated content objects below and above said at least one animated content object.

9. A non-transitory computer readable medium embodying a computer program for displaying a computer application comprising a plurality of objects layered on top of one another on a graphical user interface, said computer program comprising:
    computer program code for creating an animated content window below the computer application for each animated content object of said computer application displayed on the graphical user interface and directing the player responsible for playing the animated content object to draw the animated content directly therein;

computer program code for creating a transparent window over the computer application and each animated content window displayed on the graphical user interface;

computer program code for examining the objects of said computer application and defining a clipping mask for each animated content object corresponding generally to the animated content window created therefor;

computer program code for, starting from bottom to top, selecting an object;

computer program code for drawing said object within said computer application displayed on the graphical user interface except in areas corresponding to each clipping mask if said selected object is not an animated content object; and computer program code for removing the clipping mask defined for said animated content object, thereby to allow selected objects above said animated content object to be drawn into the transparent window and over the animated content displayed on the graphical user interface.

10. A non-transitory computer readable medium embodying a computer program for displaying a computer application on a graphical user interface, said computer program comprising:

computer program code for defining an animated content window for each animated content object of said computer application displayed on the graphical user interface;

computer program code for defining a clipping mask for each animated content object of said computer application that corresponds generally to the animated content window defined therefor, each clipping mask applying only to objects below its associated animated content object;

computer program code for defining a transparent application window overlying said computer application and each animated content window displayed on the graphical user interface;

computer program code for drawing the objects within the computer application, wherein drawn non-animated content objects below animated content objects are inhibited by the clipping masks from overwriting the animated content windows displayed on the graphical user interface; and computer program code for annotating within said transparent window, wherein annotations within said transparent window are not inhibited by said clipping masks and are displayed overtop said computer application and animated content windows on the graphical user interface.

* * * * *